April 24, 1951     H. E. HIGGINS     2,550,247

DIVING MOUTHPIECE

Filed June 2, 1950

INVENTOR.
HARVEY E. HIGGINS
BY
McMorrow, Berman & Davidson
ATTORNEYS

Patented Apr. 24, 1951

2,550,247

UNITED STATES PATENT OFFICE 2,550,247

DIVING MOUTHPIECE

Harvey E. Higgins, Enfield, Ill.

Application June 2, 1950, Serial No. 165,624

4 Claims. (Cl. 43—42.47)

This invention relates to a diving mouthpiece for attachment to a lure body.

An object of this invention is to provide an artificial bait for casting or trolling which is adapted to simulate, when being drawn through a body of water, the erratic movements of a fish.

Another object of this invention is to provide a diving mouthpiece which may be attached with speed and facility to a select one of a multiplicity of lure bodies to effect an erratic fishlike movement of said lure body when drawn through a body of water.

A further object of this invention is to provide a diving mouthpiece, which, when attached to a lure body, will effect an upward and downward movement of the body as the latter is drawn through the water.

A still further object of this invention is to provide a diving mouthpiece for attachment to a lure body, which is simple in structure and relatively cheap to manufacture.

The above and still further objects and advantages of the invention will become apparent upon consideration of the following detailed description of the invention, when taken in conjunction with the accompanying drawings, wherein.

Figure 1:
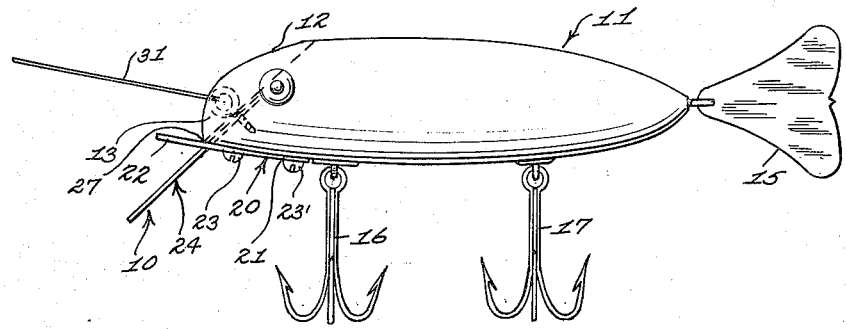
Figure 1 is a side elevational view of the diving mouthpiece of the present invention as applied to a lure body.
Figure 2:
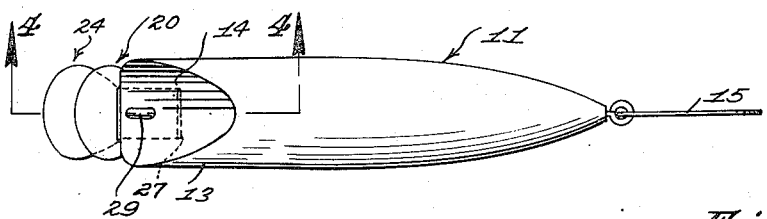
Figure 2 is a top plan view of the diving mouthpiece of the present invention as shown in Figure 1.

Referring now more particularly to the drawings, wherein like reference numerals have been used throughout the several views to designate like parts, there is shown the diving mouthpiece of the present invention, generally designated by the numeral 10, supported on a lure body 11. The lure body 11 is cylindrical in cross-section and is tapered from a point adjacent to and spaced from one end thereof toward said one end, as indicated by the reference numeral 12, to form a head 13. The tapered portion 12 of the head 13 is provided with a concavity 14 which extends between the sides of the head and upwardly and rearwardly from the under surface thereof. Disposed rearwardly of the lure body 11 contiguous to the other end thereof and mounted on the latter for pivotal movement about a vertical axis is a vertically disposed tail, designated by the reference numeral 15. Dependingly carried from the under surface of the lure body 11 are a pair of multi-pronged hooks, designated by the reference numerals 16 and 17.

The diving mouthpiece 10 is fabricated from any durable light sheet material, such as brass, and includes a first deflecting vane 20 which embodies a supporting plate 21 arranged in abutting relation with respect to the under surface of the head 13 of the lure body 11 and secured thereto by means of spaced screws, designated by the numerals 23, 23', and an arcuate fin 22 disposed exteriorly of said head in end-to-end aligned relation with respect to the supporting plate 21 and secured to the latter. Accordingly, the deflecting vane 20 has its arcuate end projecting from and terminating at a point spaced forwardly of the head 13.

The diving mouthpiece 10 further embodies a second deflecting vane 24 having one end supported within the head 13 of the lure body 11 and having its other end extending through the first deflecting vane 20 and projecting beyond the latter to a point spaced below the under surface of the head 13. The second deflecting vane 24 likewise embodies a supporting plate 25 and an arcuate fin 26 disposed in end-to-end aligned relation with respect to the supporting plate 25 and secured thereto. The supporting plate 25 of the vane 24 may be embedded within the head 13 of the lure body during manufacture, or may be supported within a mouth opening 27 provided in the head 13, the mouth opening extending upwardly and rearwardly from the under surface of the lure body and terminating at a point spaced from the upper surface thereof. The deflecting vane 20 is provided with a transversely disposed slot intermediate its ends, designated by the reference numeral 28, so that the supporting plate 25 of the deflecting vane 24 may be inserted through the vane 20 for insertion and support within the lure body.

Figure 4:
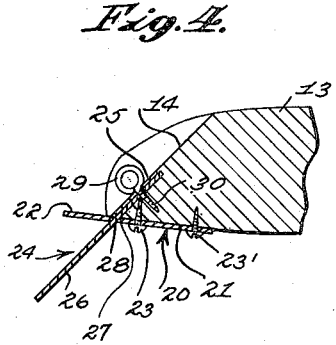
Figure 4 is a fragmentary sectional view taken along the line 4—4 of Figure 2.
Figure 3:
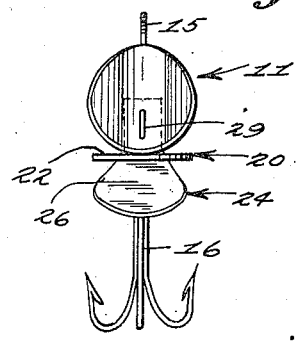
Figure 3 is a front elevational view taken from the left of Figure 1.

Overlying the concavity 14 of the lure body 11 and supported in the adjacent portions of the head 13 is a line-securing element 29. As clearly shown in Figure 4, the line-securing element includes a threaded shank 30 which extends through the supporting plate 25 of the deflecting vane 24 and is in engagement with the adjacent portion of the lure body 11. Accordingly, a line 31 may be attached to the line-securing element 29, the latter serving the dual function of supporting the line 31 and further, supporting the deflecting vane 24 of the diving mouthpiece 10.

Although the diving mouthpiece 10 of the present invention is shown supported on a specific type of lure body, it is readily apparent to one skilled in the art that the mouthpiece can be utilized with any one of a plurality of lure bodies. It is to be noted, however, that the diving mouthpiece 10 cooperates with the lure body 11 having the concavity 14 and the tail 15 to effect the novel movement of the lure body as it is drawn through a body of water.

In actual use, the line 31 is extended from a fishing rod with the lure body 11 secured thereto by means of the line-securing element 29. As the lure body is drawn through the water, the uppermost surface of the fin 26 of the deflecting vane 24 directs the water upwardly against the under surface of the fin of the deflecting vane 20 to thereby effect the periodic upward and downward movement of the lure body 11 as it is drawn through the water. It is to be further noted that the concavity 14 and the tail 15 cooperate to effect a periodic movement from side to side of the lure body as the latter is drawn through the water. The aforementioned movements of the lure body simulate, when the body is being drawn through the water, the erratic movements of a fish, and hence, is very desirable for casting and trolling.

Although only one embodiment of the diving mouthpiece of the present invention has been disclosed, it is readily apparent that numerous modifications can be made without departing from the spirit of the invention as set forth in the appended claims.

What I claim is:

1. A diving mouthpiece for attachment to a lure body including a head having a mouth opening extending upwardly and rearwardly from the under surface thereof toward and terminating at a point spaced from the upper surface thereof, said mouthpiece comprising a first deflecting vane having an opening therein and having one end adapted to be secured in abutting relation with respect to the under surface of said head and having its other end projecting from and terminating at a point spaced forwardly of said head, and a second deflecting vane having one end adapted to be supported within said mouth opening and having its other end extending through the opening in said first deflecting vane and projecting beyond the latter and terminating at a point spaced below said head, the projecting ends of said deflecting vanes cooperating together upon movement of said lure body through a body of water to effect a periodic upward and downward movement of the lure body.

2. A diving mouthpiece for attachment to a lure body including a head having a mouth opening extending upwardly and rearwardly from the under surface thereof toward and terminating at a point spaced from the upper surface thereof, said mouthpiece comprising a first deflecting vane having an opening in and having one end positioned in abutting relation with respect to the under surface of said head and having its other end projecting from and terminating at a point spaced forwardly of said head, securing means extending through said one end of said first deflecting vane and engageable with said head for detachably securing said first deflecting vane to said head, and a second deflecting vane having one end adapted to be supported within said mouthpiece and having its other end extending through the opening in said first deflecting vane and projecting beyond the latter to a point spaced below said head, the projecting ends of said deflecting vanes cooperating together upon movement of said lure body through a body of water to effect the periodic upward and downward movement of said lure body.

3. In an artificial bait for trolling, a lure body including a head adjacent one end thereof, said head being provided with a mouth opening extending upwardly and rearwardly from the under surface thereof toward and terminating at a point spaced from the upper surface thereof, there being a concavity provided in said head extending intermediate the sides thereof, and a diving mouthpiece positioned contiguous to the under surface of said head and fixedly secured to said head, said diving mouthpiece comprising a first flat deflecting vane having an opening therein and having one end secured in abutting relation with respect to the under surface of said head and having its other end projecting from and terminating at a point spaced forwardly of said head, and a second deflecting vane having one end supported within said mouth opening and having its other end extending through the opening in said first deflecting vane and projecting beyond the latter to a point spaced below said head.

4. In an artificial bait for trolling, a lure body including a head adjacent one end thereof, said head being provided with a mouth opening extending upwardly and rearwardly from the under surface thereof toward and terminating at a point spaced from the upper surface thereof, there being a concavity provided in said head extending intermediate the sides thereof, a vertically extending tail disposed rearwardly of said lure body contiguous to the other end thereof and mounted on the latter for pivotal movement about a vertical axis, and a diving mouthpiece positioned contiguous to the under surface of said head and fixedly secured to the latter, said diving mouthpiece comprising a first deflecting vane having an opening therein and having one end secured in abutting relation with respect to the under surface of said head and having its other end projecting from and terminating at a point spaced forwardly of said head, and a second deflecting vane having one end supported within said mouth opening and having its other end extending through the opening in said first deflecting vane and projecting beyond the latter to a point spaced below said head.

HARVEY E. HIGGINS.

REFERENCES CITED

The following references are of record in the file of this patent:

UNITED STATES PATENTS

| Number | Name | Date |
|---|---|---|
| 1,846,355 | Pemberton | Feb. 23, 1932 |
| 2,313,709 | Dunkelberger | Mar. 9, 1943 |
| 2,518,213 | Wood | Aug. 8, 1950 |